United States Patent [19]

Hotier et al.

[11] Patent Number: 5,578,215
[45] Date of Patent: Nov. 26, 1996

[54] CHROMATOGRAPHIC SIMULATED MOBILE BED SEPARATION PROCESS WITH DEAD VOLUME CORRECTION USING PERIOD DESYNCHRONIZATION

[75] Inventors: Gérard Hotier, Rueil Malmaison; Roger-Marc Nicoud, Richardmesnil, both of France

[73] Assignees: Institut Francais Du Petrole, Rueil Malmaison; Separex, Champigneulles, both of France

[21] Appl. No.: 494,559

[22] Filed: Jun. 22, 1995

[30] Foreign Application Priority Data

Jun. 22, 1994 [FR] France ................... 94 07763

[51] Int. Cl.$^6$ ................................ B01D 15/08
[52] U.S. Cl. ........................ 210/659; 210/198.2
[58] Field of Search .................. 210/635, 656, 210/659, 662, 198.2; 127/46.1, 46.2

[56] References Cited

U.S. PATENT DOCUMENTS

| | | | |
|---|---|---|---|
| 4,402,832 | 9/1983 | Gerhold | 210/659 |
| 4,498,991 | 2/1985 | Oroskar | 210/659 |
| 4,724,081 | 2/1988 | Kawahara | 210/198.2 |
| 4,970,002 | 11/1990 | Ando | 210/659 |
| 4,990,259 | 2/1991 | Kearey | 210/659 |
| 5,064,539 | 11/1991 | Tanimura | 210/659 |
| 5,093,004 | 3/1992 | Hotier | 210/659 |
| 5,114,590 | 5/1992 | Hotier | 210/659 |
| 5,422,007 | 6/1995 | Nicoud | 210/659 |
| 5,470,464 | 11/1995 | Priegnitz | 210/659 |

FOREIGN PATENT DOCUMENTS

| | | | |
|---|---|---|---|
| 0415821 | 3/1991 | European Pat. Off. | 210/198.2 |
| 84/02854 | 8/1984 | WIPO | 210/198.2 |
| 90/06796 | 6/1990 | WIPO | 210/198.2 |

*Primary Examiner*—Ernest G. Therkorn
*Attorney, Agent, or Firm*—Millen, White, Zelano, & Branigan, P.C.

[57] ABSTRACT

Perturbations are corrected in the compositions of an extract (EA) or raffinate (RB) due to the dead volume introduced by at least one recycling pump (P) for a liquid, supercritical or gaseous mixture in a closed circuit of column sections, or due to a degradation in their separating power each time an injection or extraction stream passes from a position anterior to a position posterior to each of the dead volumes in the circuit or each section whose separation power has been degraded. Firstly, the connection period for said stream to the circuit is increased by an appropriate value, and then when the stream passes from the posterior position to the dead volume, or connection to the degraded section, to the following position, the connection period is reduced so that the period regains the value which would have been applied if each of the dead volumes had been ignored or the degradation in the separation powers had been ignored.

13 Claims, 4 Drawing Sheets

CHROMATOGRAPHIC SIMULATED MOBILE BED SEPARATION PROCESS WITH DEAD VOLUME CORRECTION USING PERIOD DESYNCHRONIZATION

The present invention concerns a process for the fractionation of fluid mixtures of components using a chromatographic method.

It is particularly applicable to the separation of aromatic hydrocarbons containing eight carbon atoms.

Chromatography is based on the fact that certain porous solids, in the presence of liquid, gaseous or supercritical mixtures, can retain the different constituents of the mixture to a greater or lesser extent.

Separation processes based on chromatography are usually operated as follows: the porous solid, of known granulometry, is contained in a generally cylindrical receptacle, the column; this constitutes the stationary phase. The mixture to be separated is percolated through the column, and the constituents arrange themselves successively depending on the extent to which they are retained by the stationary phase.

The prior art is illustrated in European patent EP-A-0 415 821, and International patents WO-A-84 02854 and WO-A-90 06796.

The separation process of this invention is simulated mobile bed chromatographic separation, in counter-current or co-current mode, such as that described in particular in United States patents U.S. Pat. No. 2,085,589, U.S. Pat. No. 4,402,832 and U.S. Pat. No. 4,498,991.

DESCRIPTION OF THE PREFERRED EMBODIMENTS

One way of explaining the operation of a simulated mobile bed chromatographic separation process consists of representing it by an equivalent real counter-current process.

Figure 1:
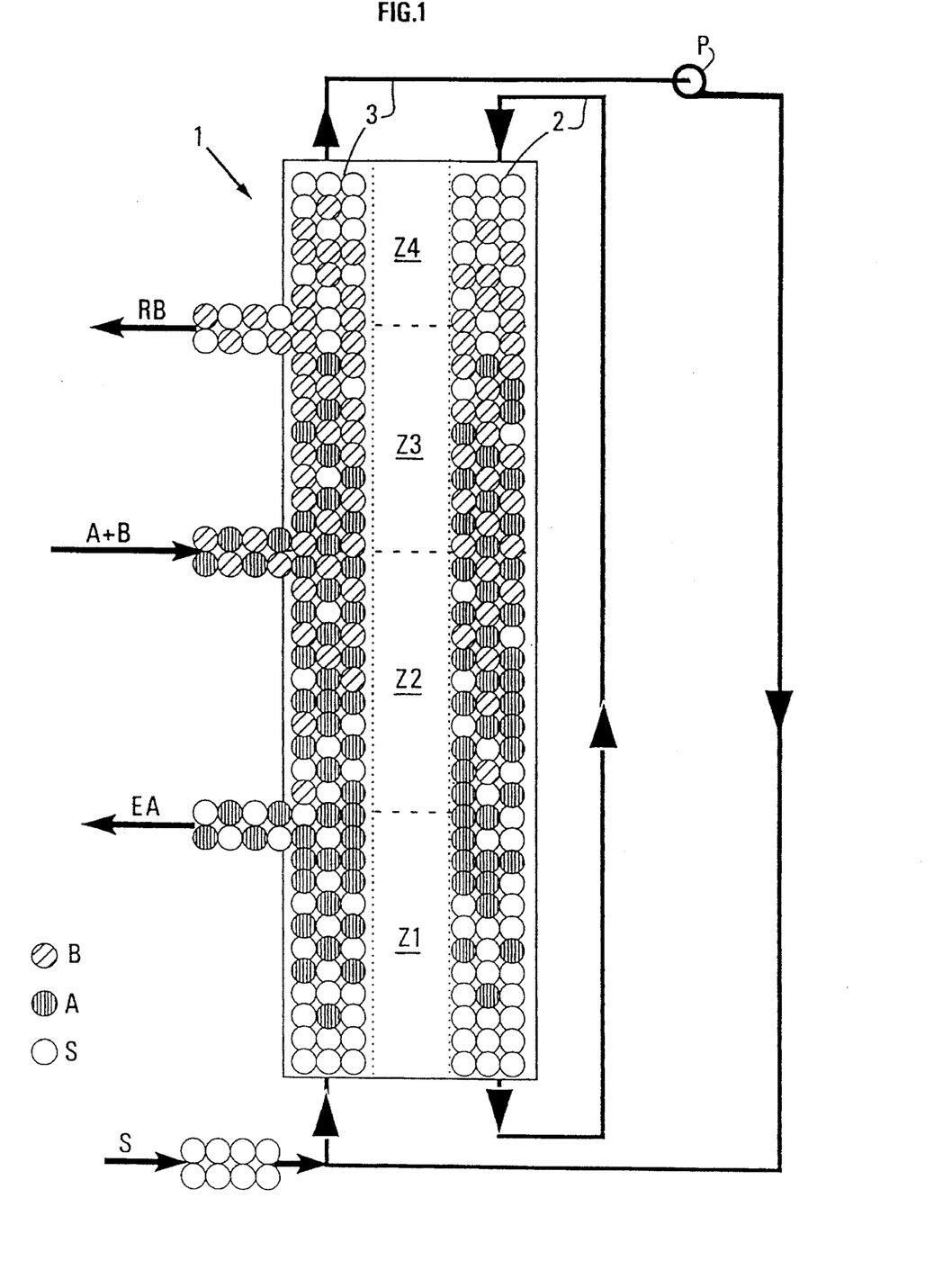
FIG. 1 shows the principle of real counter-current separation.

In the real counter-current process represented in FIG. 1 and containing four zones Z1, Z2, Z3 and Z4, a fixed and constant concentration profile develops in separation column 1, where the positions of injection points for a feed A+B and an eluent S, and of extraction points for an extract EA and a raffinate RB remain fixed, while the solid adsorbent 2 and liquid 3 displace counter-current to each other. In this process, recycling pump P returns liquid from a high point to a low point in the column, while a mobile bed system, for example, returns the solid from the low point to the high point. These two systems contain a point where the only species present in the concentration profile in both the liquid and the solid is the eluting eluent. This point is at the junction of zones I and IV (see FIG. 1). In this situation, the volumes of liquid and solid engaged in the recycling systems are of no real interest since only one species is present and backmixing effects are of no consequence.

The success of simulated mobile bed chromatographic separation processes leans on the difficulty of correctly circulating a solid without causing attrition and without considerably increasing the porosity of the bed compared with a fixed bed. In simulated mobile bed processes, the solid is located in a number n of fixed beds, n generally being between four and twenty-four. The major difference between real counter-current processes and simulated mobile bed processes is due to the fact that in the latter, the concentration profile is no longer fixed but displaces at a uniform rate around a closed circuit constituted by n fixed beds or chromatographic columns disposed in a series where the outlet to the $n^{th}$ fixed bed is connected to inlet to the first bed.

Two cases of simulated mobile bed processes must be considered, differing in the manner in which the recycling pump (for liquids and supercritical fluids which are dense enough to pump) or a recycling compressor (for gases and non pumpable supercritical fluids) which circulate the liquid in the circuit of n fixed beds:

A) In a first case, each fixed bed is contained in an individual column and the recycling pump can be displaced from one column junction to the next at the same rate as that of the fluid injection and extraction points. In this case (as described in U.S. Pat. No. 5,093,004 and WO 93/22022), the volume of the line bringing the fluid from the outlet to one column to the recycling pump inlet, the volume of the pump itself and the volume of the line bringing the fluid from the pump outlet to the inlet to the following column (the total of these three terms constituting the volume of the recycling circuit) are, as in the case of real counter-current separation, of no consequence since these volumes are designed to be occupied exclusively by pure eluent.

Figures 2A, 2B, 2C:
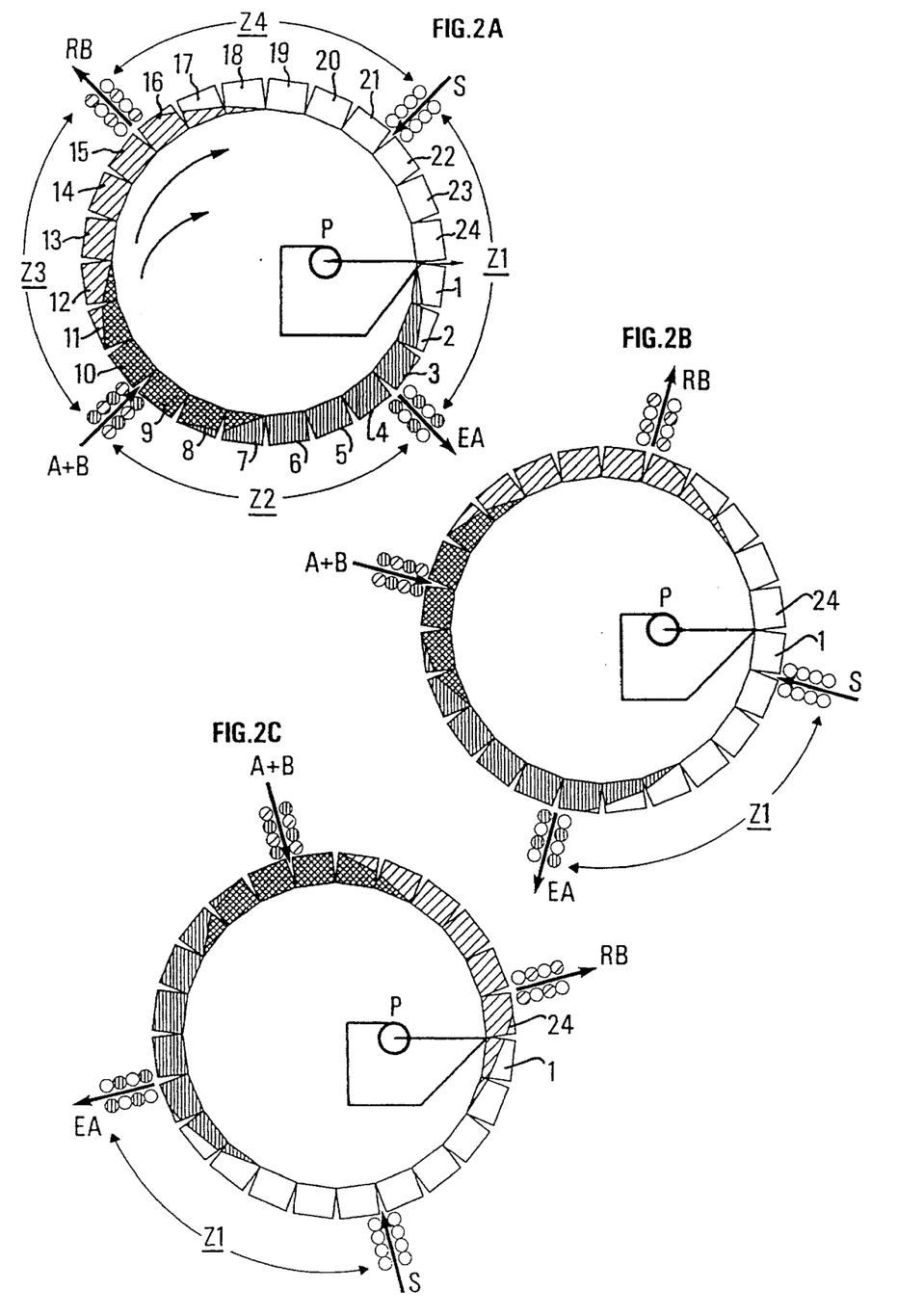
FIGS. 2A, 2B, 2C show the operation of simulated counter-current separation.

B) In a second case, each fixed bed or chromatographic column section is connected to the next by a line which can only go to the next bed (in particular when several fixed beds are located in the same column) except for the $n^{th}$ whose outlet is connected to the inlet of the recycling pump P, the outlet of said pump P being connected to the first of the fixed beds (see FIG. 2). Naturally, the numbering of these column sections is purely arbitrary; by convention, the first is considered to be the section with its inlet connected to the recycling pump outlet and the last or $n^{th}$ has its outlet connected to the inlet of the pump. In this case, the recycling pump will pass all of the concentration profiles. The dead volume of the pump creates an anisotropy in the volume of the $n^{th}$ fixed bed compared with the others and causes a perturbation in the compositions of the extract and raffinate, reducing the purity and the yield. In general, in order to minimise the total dead volume in the circuit, the junction lines between the different columns are all designed to have the same volume, this volume being reduced to the minimum volume possible. When the fluid in the system is a gas recycled by a compressor, the observed perturbation is much lower than that obtained in the case of a liquid or a pumpable supercritical fluid. For gases at low pressure, the perturbation is negligible.

In order to operate the process, there must be a different flow rate in each zone and thus the recycling pump (or the compressor) adopts at least four different flow rates during the course of a cycle. Changes in the loading of the recycling pump (regulated by flow rate) take place each time that one of the inlet or outlet streams of the circuit passes from a position immediately anterior to a position immediately posterior to the recycling pump. Thus, when the eluent S injection point passes from the anterior connection to the posterior connection to the recycling pump, the load on the latter becomes D4 (the flow rate of zone 4). Then when the raffinate extraction point RB passes from the anterior connection to the posterior connection to the recycling pump, the load on the latter becomes D3 (the flow rate in zone 3), where D3=D4+R, where R represents the raffinate flow rate. When the feed A+B injection point passes from the anterior connection to the posterior connection to the recycling pump, the load on the latter becomes D2 (the flow rate in zone 2), where D2=D4+R−C, where C represents the flow rate of the feed. Finally, when the extract extraction point EA passes from the anterior connection to the posterior connection to the recycling pump, the load on the latter becomes D1 (the flow rate in zone 1), where D1=D4+S where S represents the eluent flow rate.

For simplicity, the unit can be represented as an ensemble of segments which desirably should all be of the same length L (these segments symbolise the column sections). However, we are obliged to add a length l (l symbolises the dead volume of the recycling circuit) to one of the segments When the unit is operating, a point displaces along these segments with a constant speed u. The point requires a time $\Theta$ to traverse the ensemble of the n segments and the operation is optimised when the segment junctions are crossed in a synchronised manner at times which are multiples of $\Theta/n$. In the ideal case (n segments of length L), $T=\Theta/n=L/u$; in a real case, T and $\Theta$ are fixed by ignoring l. The total length to be traversed is no longer n.L but n.L+l; during each period T, the point traverses a distance L+l/n, but it should traverse a distance L for the first n−1 periods and L+l for the last period. Passage of the point across the segment junctions is no longer synchronised to multiples of T but is only synchronised for each multiple of $\Theta$. L, l and u respectively can be obtained by dividing the volume V of each of the sections, the dead volume v of the recycling circuit and the flow rate Di in the sections by the cross section of the sections.

Figure 4:
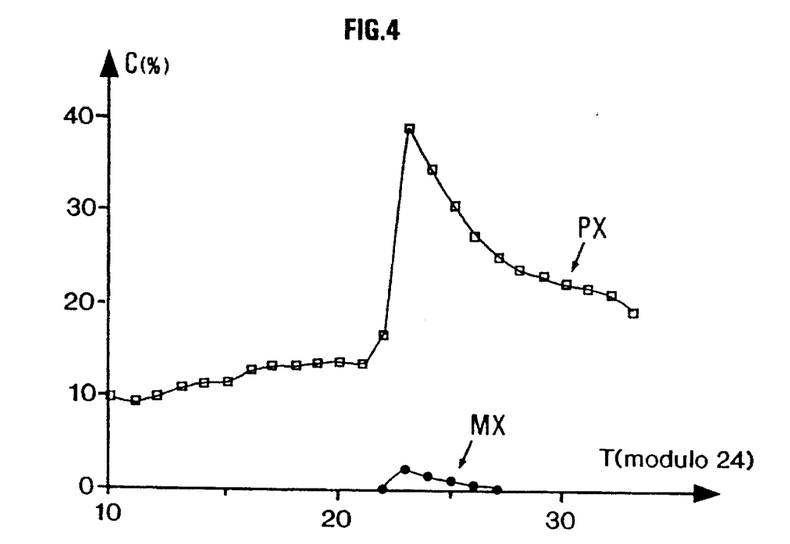
FIG. 4 shows variations in the composition C (weight %) of samples of extract taken at the same instant in each period T of the cycle as a function of the period number in the cycle (modulo 24)

FIG. 4 shows an example of the perturbation caused by the volume of the recycling circuit on the instantaneous composition of the extract taken at the same moment in each period, period by period, in a simulated mobile bed with 4 zones and 24 sections. If several successive cycles are observed, the perturbation is seen to have a periodicity of 24 periods, i.e., 1 cycle (Proceedings of the 9th International Symposium on Preparative Chromatography, Nancy, April 1992, Balannec-Hotlet).

Further, French patent application 94/05293 describes a simulated mobile bed separation process with a constant recycle flow rate where the recycling pump has its inlet connected to the $n^{th}$ fixed bed and its outlet connected to the first fixed bed. Thus the ensemble of the concentration profiles pass through it. The introduction and extraction circuits in the chromatographic system are independently shifted and there is no longer a unique shift period but a table [$T_j^i$] of shift times whose calculation is based on the fact that the eluted volume at the outlet to each zone must be constant and equivalent to that of an equivalent conventional simulated mobile bed, such that $$Vk=Dk.T=D_k^P(T_{i+1}^j-T_i^j-1)$$

where

Dk represents the flow rate in zone k in the conventional simulated mobile bed;

T represents the shift period, of the conventional simulated mobile bed;

$D_k^P$ represents the flow rate in zone k in the simulated mobile bed with a constant recycle flow rate when the pump is in zone p;

$T_{i+1}^j$ represents the instant where the flux removed or introduced shifts from the outlet to the $j^{th}$ section to the outlet to the following section, where:

j is the number of the section immediately preceding the injection or extraction point;

i is the number of times the slowest of the z circuits has already shifted since the start of the cycle.

This relationship is based on an ideal system where the dead volume of the recycling circuit is considered to be negligible. However, in practice this type of system behaves exactly like a conventional simulated mobile bed and exhibits the same perturbations due to the dead volume of the recycling circuit which introduces an anisotropy.

The foregoing shows clearly that the introduction of a recycling pump and its connections between two particular beds in a closed circuit of n beds or sections creates an additional volume which causes a perturbation in the compositions of the extract and the raffinate. In industrial practice, systems are known which use two recycling pumps: one which is flow rate regulated, located between the $n^{th}$ and the first bed, and the other which is pressure regulated, between the $(n/2)^{th}$ and the $(n/2+1)^{th}$ bed. Clearly, in this case two volume anisotropies appear instead of one. Further, it is difficult to ensure strictly isotropic properties in each of the n beds, and even if isotropy could be achieved when the system is put into operation, over time the beds would probably not all age in the same fashion and differences would appear in the behaviour of the beds and thus in the separation properties of some beds. Two examples will support these claims. In large units (several hundreds of m³) used in the petrochemical industry, each bed of identical size (typically 10 to 20 m³) is packed with a molecular sieve in the form of spherules with a granulometry of 0.3–0.9 mm. Regardless of the care taken in packing each bed, it is difficult to achieve a difference of less than 3% between the quantities of sieve packed in the best and worst packed of these beds respectively. In units of far more modest size (several liters), for example for separating enantiomers on a modified cellulose gel (which is prone to crushing), the total of the pressure losses in the system can be as high as 10 MPa. It can be imagined that, over time, a difference will develop in the packing between the bed operated at the highest pressure (at the recycling pump outlet) and that operated at the lowest pressure (pump inlet).

A first object of the invention is thus to overcome the perturbation in the composition of the extract and raffinate caused by the dead volume in the recycling pump located between the $n^{th}$ and the first bed.

More generally, a second object of the invention is to overcome perturbations in the extract and raffinate compositions caused by the dead volumes of the various apparatus located between two consecutive beds in the circuit.

A third object of the invention is to overcome the cyclic perturbations in the extract and raffinate composition caused by a difference in the separation properties of one or more beds compared with others, whether this difference in the separation properties is present from the beginning of service or the result of aging. Most generally, the object of the invention is to overcome cyclic perturbations in the extract and raffinate composition caused by any difference in the properties of one or more particular beds in the circuit compared with others, these differences in properties in particular being volume, quantity of adsorbent phase, adsorption capacity and selectivity.

More precisely, the invention concerns a process for the simulated mobile bed separation of a feed containing at least two constituents in the presence of at least one eluent into at least two fractions, the simulated mobile bed comprising n, advantageously 4 to 24, chromatographic columns or column sections mounted in series and in a closed circuit, in which a liquid, supercritical or gaseous mixture circulates under pressure, the circuit having at least one feed injection stream, at least one eluent injection stream, at least one extract extraction stream and at least one raffinate extraction stream, at least four zones each comprising at least two sections being determined in said columns, each zone being separated from the following zone by an injection or extraction stream, the injection and extraction streams being independently shifted at programmed time intervals such that after n shifts, each stream has traversed the whole circuit, the closed circuit comprising a recycling pump for said mixture, which is flow rate regulated and located between two successive columns or column sections, optionally at least one measuring or sampling means and optionally at least one recycling pump which is pressure regulated, said measuring or sampling means and/or pressure regulated recycling pump each being located between two consecutive columns or column sections, said pumps and/or measuring or sampling means each having a dead volume in the recycling circuit which causes perturbations in the extract and in the raffinate composition, the circuit optionally containing one or more sections whose separation properties are degraded compared with those of other sections, thus causing perturbations in the composition of the extract and of the raffinate, the process being characterised in that, each time that an injection or extraction stream passes from an immediately anterior position to an immediately posterior position to each of the dead volumes in the circuit or each of the sections with degraded separation properties, the connection period for said stream to the circuit is first increased by an appropriate value, and then when the stream passes from the immediately posterior position to the dead volume or degraded section to the following position, said connection period is reduced so that said period regains the value which would have been applied if the dead volume had been ignored or the degradation in the separation properties had been ignored.

The term "recycling pump" must be taken in its generic sense as a circulation means, i.e., a pump in the case of a pumpable liquid or supercritical mixture, and a compressor in the case of a pressurized gaseous mixture or a less dense supercritical mixture.

The invention is only applicable under the following conditions:

each injection and extraction circuit is shifted independently of the others. This means that each of the streams introduced or removed must be controlled either by a n-position valve of by n on-off valves, the valves preferably being connected to a control centre;

each of the zones comprises a minimum of two beds, since when using the means described below, at certain instants when the exit of one zone passes the anisotropy which is to be corrected, this zone is shortened by one bed.

The method will now be described in respect of the anisotropy solely due to the dead volume in the recycling circuit in the system. Using the schematisation described above, the problem thus consists of re-establishing a situation such that the point arrives at the end of each segment at the end of each period in the cycle. The proposed means consists of changing the total period of the cycle from $\Theta$ to $\Theta'$ such that $\Theta = nT$ and $\Theta' = (n-1)T + T'$. This means thus consists of keeping the speed u of each point constant, and each "normal" segment will be traversed in a time $T = L/u$, while the longer segment will be traversed in a time $T' = (L+l)/u$. The image of a point which is displacing is a simplification which is intended to aid comprehension of the system. In fact, there are as many points in the system as there are zones which displace. Since these points pass through the longest segment at different times during the cycle, they become desynchronised even though the basic shift period remains the same.

FIG. 2 represents the operation of a simulated counter-current apparatus where the liquid and the commutation displacement displace in the same sense (clockwise). The apparatus comprises 24 columns connected together, column 24 (n) and column 1 being connected via a fixed recycling pump P. Zone 1 is delimited by the eluent injection point S and extract extraction point EA, zone 2 by the extract extraction point and the feed injection point A+B, zone 3 by the feed injection point A+B and the raffinate extraction point RB, and zone 4 by the raffinate extraction point and the eluent injection point. At the end of each period, the injection and extraction streams are shifted.

To clarify further, let us consider a simulated counter-current system with 8 beds or columns each with a void space of 80 $cm^3$, a dead volume in the recycling circuit of 10 $cm^3$ and a 100 second shift period, defining four zones each of two columns. In zone 1 between the eluent injection point and the extract extraction point, the flow rate is 40 $cm^3$/min. In zone 2 between the extract extraction point and the feed injection point, the flow rate is 32.5 $cm^3$/min. In zone 3 between the feed injection point and the raffinate extraction point, the glow rate is 37.5 $cm^3$/min. In zone 4 between the raffinate extraction point and the eluent injection point, the flow rate is 30 $cm^3$/min. During the first period of the cycle, 8 in total, the eluent is injected at the inlet to bed 1, the extract is removed at the outlet to bed 2, the feed is injected at the inlet to bed 5 and the raffinate is removed at the outlet to bed 6. The operation of the prior art system without compensation for the dead volume, and in accordance with the invention with compensation, are respectively compared in Tables 1 and 2.

TABLE 1

| Period in cycle | Time | | No compensation | | | |
| --- | --- | --- | --- | --- | --- | --- |
| | start | end | Eluent injection in bed: | Extract extract'n from bed | Feed injection in bed: | Raffinate extract'n from bed: |
| 1 | 0 | 100 | 1 | 2 | 5 | 6 |
| 2 | 100 | 200 | 2 | 3 | 6 | 7 |
| 3 | 200 | 300 | 3 | 4 | 7 | 8 |
| 4 | 300 | 400 | 4 | 5 | 8 | 1 |
| 5 | 400 | 500 | 5 | 6 | 1 | 2 |

TABLE 1-continued

| | | | No compensation | | | |
|---|---|---|---|---|---|---|
| Period in cycle | Time start | end | Eluent injection in bed: | Extract extract'n from bed | Feed injection in bed: | Raffinate extract'n from bed: |
| 6 | 500 | 600 | 6 | 7 | 2 | 3 |
| 7 | 600 | 700 | 7 | 8 | 3 | 4 |
| 8 | 700 | 800 | 8 | 1 | 4 | 5 |
| 1 | 800 | 900 | 1 | 2 | 5 | 6 |

Figure 3:
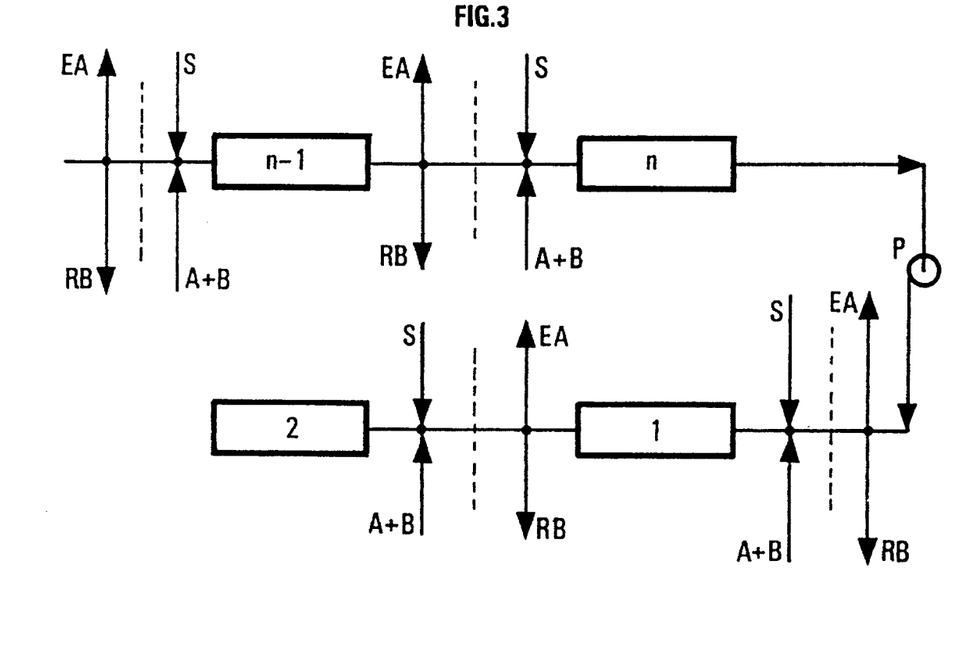
FIG. 3 shows a simulated mobile bed where the recycling pump is fixed to the $n^{th}$ bed or column section.

FIG. 3 shows a variation in the succession of column sections n, extract extraction EA, raffinate extraction RB, feed injection AB and eluent injection S between two sections. Further, this figure shows the

TABLE 2

| | Eluent | | | Extract | | | Feed | | | Raffinate | | |
|---|---|---|---|---|---|---|---|---|---|---|---|---|
| | with compensation | | | | | | | | | | | |
| Period in cycle | Injection into bed no | Start | End | Extraction from bed no | Start | End | Injection into bed no | Start | End | Extraction from bed no | Start | End |
| 1 | 1 | 0 | 117,15 | 2 | 0 | 100 | 5 | 0 | 100 | 6 | 0 | 100 |
| 2 | 2 | 117,15 | 217,15 | 3 | 100 | 200 | 6 | 100 | 200 | 7 | 100 | 200 |
| 3 | 3 | 217,15 | 317,15 | 4 | 200 | 300 | 7 | 200 | 300 | 8 | 200 | 317,15 |
| 4 | 4 | 317,15 | 417,15 | 5 | 300 | 400 | 8 | 300 | 400 | 1 | 317,15 | 417,15 |
| 5 | 5 | 417,15 | 517,15 | 6 | 400 | 500 | 1 | 400 | 517,15 | 2 | 417,15 | 517,15 |
| 6 | 6 | 517,15 | 617,15 | 7 | 500 | 600 | 2 | 517,15 | 617,15 | 3 | 517,15 | 617,15 |
| 7 | 7 | 617,15 | 717,15 | 8 | 600 | 717,15 | 3 | 617,15 | 717,15 | 4 | 617,15 | 717,15 |
| 8 | 8 | 717,15 | 817,15 | 1 | 717,15 | 817,15 | 4 | 717,15 | 817,15 | 5 | 717,15 | 817,15 | recycling pump and/or measuring means located immediately upstream of the extract extraction stream EA or raffinate extraction stream RB, these latter being located upstream of bed 1.

Referring to FIG. 3, it can be seen that when an extraction point passes from the exit to bed 7 to the exit to bed 8, the volume in the recycling pump is inserted between the exit to bed 8 and the point where extraction is effected. However, the shift period remains the same: 100 seconds. This results in desynchronisation of the extraction position compared with the concentration profile.

A compensation solution which would be ideal, but which could not be achieved in practice because the same total cycle time could not be achieved for each of the streams introduced and removed, would consist of, each time a stream which was introduced or removed "crossed" the volume of the recycling pump, dividing the dead volume v by the flow rate $D_i$ in each of the zones to find the period $\delta t$ which would have to be added to T to obtain perfect compensation each time: $T'=T+v/D_i$.

A practical compensation solution preferably consists off dividing the dead volume of the recycling circuit by the average weighted flow rate of the system:

$$DM = \left( \sum_i C_i D_i \right)/n,$$

where $C_i$ and n respectively represent the number of beds in zone i and the total number of beds: thus $\delta t=v/DM$, and adding this period $\delta t$ to T such htat $T'=T+\delta t$ at the instant when the injection or extraction point under consideration passes from the position just anterior to the position just posterior to the recycling pump. In this manner, a unique cycle time is retained, thus keeping a viable system with, for example, 90% compensation for the shift. Perfect compensation is normally not possible since clearly a void space cannot selectively retard the different constituents of the feed as would an adsorbent. It should also be noted that when $\delta t=v/DM$, the perturbations in extract and raffinate composition are both attenuated equivalently. It may be desirable, for example, to totally annul the perturbation in the extract composition (meaning having a larger residual perturbation in the raffinate). In this case $\delta t$ is selected to equal v/D1 since the extract is removed from the outlet to zone 1.

More generally, the following is used:

$$v/\min(D_i) > \delta t > v/\max(D_i),$$

where $\min(D_i)$ and $\max(D_i)$ respectively represent the lowest and the highest recycle flow rate (of the four flow mates, when there are four zones).

In a second variation, the fluid mixture can be a pressurized gas or a less dense supercritical fluid. In this case, it is driven by a compressor which is flow rate regulated and optionally by at least one pressure regulated compressor. The correcting term can then be attenuated by multiplying it by the ratio of the densities of the fluid phase df and the adsorbed phase da.

In the case shown in FIG. 3, when a removed stream passes from the outlet to the n–1$^{th}$ to the outlet to the n$^{th}$ bed and when the introduced stream passes from the inlet to the n$^{th}$ bed to the inlet to the first bed, $\delta t$ must be added to re-establish isochronicity of the displacement of the concentration profile compared with the injections and extractions.

Two other possible situations are:

In a variation which is not illustrated, the extraction points from the n$^{th}$ bed and those for introduction into the first bed can be between the n$^{th}$ bed and the recycling pump; in this case, when a removed stream passes from the outlet to the n$^{th}$ to the outlet to the first bed and when an introduced stream passes from the first to the inlet to the second bed, $\delta t$ must be added.

In a further variation which is not illustrated, the extraction points from the n$^{th}$ bed are located between the n$^{th}$ bed and the recycling pump, while the introduction points into the first bed are located between the recycling pump and the first bed. In this case, when a removed stream passes from the outlet to the n–1$^{th}$ to the outlet to the n$^{th}$ bed and when an introduced stream passes from the inlet to the first to the inlet to the second bed, $\delta t$ must be added.

More generally, if as is often the case two or more recycling pumps are used, the problem of two or more anisotropies of volume is resolved in the same way: the connection period for an injection or extraction stream is increased by $\delta tj$ when the latter crosses one of the dead volumes vj following the rule stated above.

While the main cause of introduction of dead volumes in a simulated mobile bed chromatographic apparatus is the recycling pump(s), the introduction of other apparatus between two particular columns will produce the same effects: some measuring or sampling apparatus can be mentioned such as a flow meter, a spectrometer cell to measure the composition on-line, a by-pass or a sampling circuit. Each particular anisotropy, thus each dead volume caused by the introduction of a particular apparatus, can be compensated for by increasing the connection period T by a period $\delta tj$ for each injection or extraction stream when it crosses that dead volume. We therefore have the relationship:

$$T'=T+\delta tj$$

where T and T' respectively represent the connection period for an injection or extraction stream to a position in the circuit which is not immediately downstream of a dead volume and the connection period for an injection or extraction stream at a position immediately downstream of a dead volume, $\delta tj$ representing the incremental period added to T to correct the perturbations in the composition of the extract and raffinate resulting from said dead volume. The value of $\delta tj$ is in the interval calculated according to the relationship:

$$vj/\max(D_i)<\delta tj<vj/\min(D_i),$$

where vj represents the dead volume which is to be compensated, $\min(D_i)$ and $\max(D_i)$ respectively represent the smallest and the largest recycle flow rates for the conventional simulated mobile bed or equivalent conventional simulated mobile bed in the case of a simulated mobile bed with a constant recycle rate.

Preferably, the value of $\delta tj$ is calculated using the relationship:

$$\delta tj=vj/DM,$$

DM being the average weighted recycle flow rate in the case of a conventional simulated mobile bed, and $$\delta tj=vj/Drcy,$$

where Drcy is the constant recycling flow rate in the case of a simulated mobile bed with a constant recycle flow rate.

If the extraction points of the $n^{th}$ bed and the injection points in the first bed are placed between two distinct dead volumes or two anisotropies, for example the recycling pump and a measuring apparatus or between the recycling pump and a line which is longer than the others, the situation arises where the shift period must be successively corrected by $\delta t_1$ then in the following period by $\delta t_2$ when each stream passes this series of two volume anisotropies.

In the variation using pressurized gas or less dense supercritical liquid, the terms $\delta tj$ can be attenuated by multiplying them by the ratio of the density of the fluid phase df and the adsorbed phase da.

In a further aspect, the correction of anisotropies in the separation properties resulting either from differences in packing from bed to bed or to variations in aging from bed to bed constitutes a slightly different problem which can, however, be resolved using the invention, i.e., by desynctonisation of the shift times of the different streams.

The molecular sieve loaded into large petrochemical units operated as simulated mobile beds can be characterised by an optimum packing density and four volume fractions. When considering a bed filled with this sieve, we must consider:

the intergrain void fraction, or porosity of the bed, the macroporosity fraction in the grains, or grain porosity, the microporosity fraction in the crystallites, or useful volume, or adsorption capacity, the inaccessible fraction, or solid volume.

For a Y zeolite close to that of Examples 1 and 2, the value of 0.84 g/cm$^3$ was determined. For a column of 100 cm$^3$, using an appropriate method (for example a pulse test) it was shown that the respective elution volumes for an unadsorbed tracer, the least adsorbed constituent and the most adsorbed constituent in the feed to be separated was respectively 57 cm$^3$, 64 cm$^3$, and 75 cm$^3$.

When loading the beds of the industrial unit by weighing the quantities introduced into each bed, it could be shown that, for example, 22 beds out of 24 had an acceptable packing density of between 0.835 g/cm$^3$ and 0.842 g/cm$^3$, one bed had a density of 0.830 g/cm$^3$ and the other bed had a density of 0.823 g/cm$^3$. Compared with the optimum packing density, the "yield" or "packing efficiency" was thus 98% for the least well packed section. This particular bed would thus behave as a bed with volume 0.98 V followed by a dead volume of 0.02 V. Translating these figures for the 100 cm$^3$ column on which the same pulse test experiment using the tracer and the two feed constituents is carried out, respective elution volumes of 57.86 cm$^3$, 64.72 cm$^3$ and 75.5 cm$^3$ would be obtained.

Considering again the operation described above for compensation for the dead volume, as well as the four values for the flow rates in the simulated mobile bed, respectively 40 cm$^3$/min in zone 1, 32.5 cm$^3$/min in zone 2, 37.5 cm$^3$/min in zone 3 and 30 cm$^3$/min in zone 4, and the shift period of 100 seconds, it is simple to calculate the preferred correction to be applied to the period of 100 seconds (while retaining the same flow rates) each time a connection passes from the position preceding this section where the separation properties are degraded to the following position:

$$T' = 0.98\,T + \frac{0.02\,V}{DM}\,,\text{i.e.,}$$

$$T' = 0.98 \times 100\,s + \frac{0.02 \cdot 100}{\frac{40+37.5+32.5+30}{4 \times 60}}\quad \text{i.e.,}$$

$$T' = 101.45\,s$$

More generally, during operating of a simulated mobile bed unit which has been compensated for its various initial anisotropies, it is possible to detect the appearance of a periodicity in the value $\Theta$ (the cycle time) in the curves of extract and raffinate compositions as a function of time. This behaviour indicated different aging or degradation in certain beds with respect to the average. Provided that the overall loss in performance remains small, breakdown and/or pulse tests can be used to determine the guilty bed. By means of these tests, it is possible to go back to the isothermal values and transfer coefficients on which the calculations for the flow rates and shift periods for the simulated mobile bed are based. Using the methodology discussed above (juxtaposition of a section with a different length but whose separation properties are isotropic and a void section), it is possible to erase most of the perturbations observed by calculating the preferred value for the connection period to be applied to the steams in the section which has evolved differently to the others.

In other words, the connection period to the circuit can be changed using the relationship:

$$f.T+f'.V/\max(D_i) < T' < f.T+f'.V/\min(D_i)$$

and preferably in accordance with the relationship:

$$T'=f.T+f'.V/DM$$

or in accordance with the relationship:

$$T'=f.T+f'.V/Drcy,$$

where T', T, $\max(D_i)$, $\min(D_i)$, DM and Drcy have the same meanings as given above, and where f represents the ratio of the length of a section with isotropic properties to the other sections, to a normal section length, where V represents the void volume of a section and where f' represents the ratio of the length of a void section which must be associated with the shortened section but with isotropic properties to obtain the equivalent separation properties to a section whose properties are degraded, to a normal section length.

In a final variation of the invention, when one or more dead volumes and one or more sections with degraded separation properties are encountered simultaneously in a circuit, the necessary corrections described in the present invention are added together.

Figure 5:
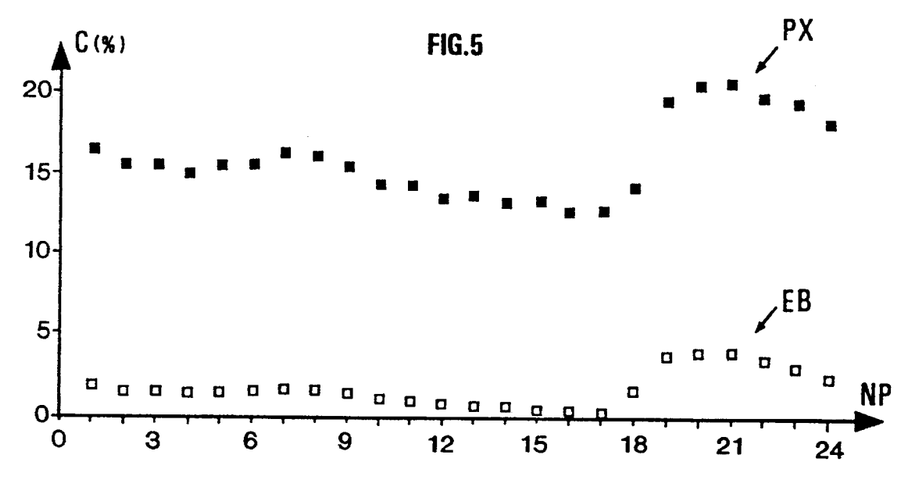
FIG. 5 shows variations in the average composition C (weight %) of the extract for each period in the cycle as a function of the period number NP in the cycle, without compensation for the dead volume.
Figure 6:
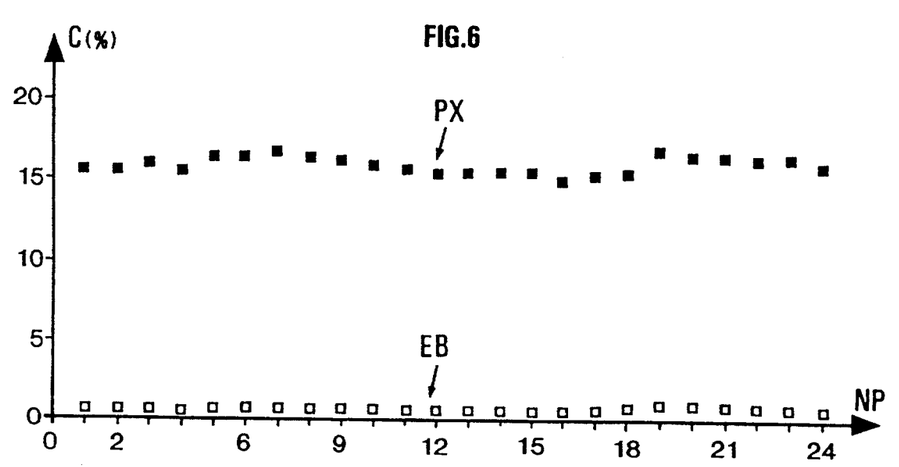
FIG. 6 shows variations in the average composition C (weight %) of the extract for each period in the cycle as a function of the period number NP in the cycle, with the compensation of the invention applied.

The following examples illustrate the invention. FIG. 5 shews the composition of the extract period by period without any compensation. FIG. 6 shows the same diagram when compensation is effected by addition of a time δt to the shift period for each stream when the latter passes the recycling circuit.

EXAMPLE 1 (comparative)

In accordance with the prior art, a feed with the following composition was separated: ethylbenzene (EB) 12.07%, para-xylene (PX) 22.95%, ortho-plus meta-xylene (OX+ MX) 64.98%. The unit consisted of 24 columns of 1 m in length and 1 cm diameter, operated as a simulated mobile bed in counter-current mode. The lines and pump intercalated between columns 24 and 1 created a dead volume of 17.25 cm³. The respective flow rates of the feed, the eluent constituted by substantially pure toluene, the extract and the raffinate were 1.42 cm³/min, 2.45 cm³/min, 2.05 cm³/min and 1.82 cm³/min. The adsorbent was a barium and potassium exchanged Y zeolite such as SPX 2000 from CECA (France). The columns were divided as follows: 5 in zone 4, 4 in zone 3, 7 in zone 2, 8 in zone 1. The recycling pump flow rates were as follows: 5 times in zone 4, 9.1 cm³/min, 4 times in zone 3, 10.92 cm³/min, 7 times in zone 2, 9.5 cm³/min and 8 times in zone 1, 1.55 cm³/min. The shift period was five minutes. During the first period of the cycle, the eluent was injected into the inlet to column 1, the extract was removed from the outlet to column 8, the feed was injected into the inlet to column 16 and the raffinate was removed from the outlet to column 19. The average purity obtained for the para-xylene in the extract was 90.70% and the yield was 99.90%. FIG. 5 shows that the compositions of the extract measured period by period were very variable.

EXAMPLE 2

In accordance with the invention, with all the other parameters remaining the same, the following sequencing was imposed on the injection and extraction points:

the eluent injection point shifted the first time after 6 min 40 s and the following 23 times after 5 minutes.

the raffinate extraction point shifted the first 5 times after 5 minutes, the sixth time after 6 min 40 s and the following 18 times after 5 minutes.

the feed injection point shifted the first 9 times after 5 minutes, the tenth time after 6 min 40 s and the following 14 times after 5 minutes.

the extract extraction point shifted the first 16 times after 5 minutes, the 17th time after 6 min 40 s and the following 7 times after 5 minutes.

The total period of the cycle increased from 120 minutes to 121 min 40 s. The flow rate of the recycling pump was 9.1 cm³/min for the first 25 minutes (as above), 10.92 cm³/min for the next 20 minutes (as above), 9.5 cm³/min for the next 35 minutes (as above) and finally 11.55 cm³/min for the remaining 4.1 min 40 s.

The average purity obtained was 96.71% and the yield was 99.78%; FIG. 6 shows that the compositions of extracts taken period by period were extremely close: the maximum difference had been divided by 8. The value of δt of 1 min 40 sec was obtained by dividing v=17.25 cm³ by DM=10.337 cm³/min. This value was between 17.25/11.55=1 min 30 s and 17.25/9.1=1 min 54s.

EXAMPLE 3

In the case of a simulated mobile bed with a constant recycle flow rate as described in French patent application 90/5293, since the perturbation produced by the introduction of one or more dead volumes in the recycling circuit is equivalent to that observed for the equivalent conventional simulated mobile bed, the correction provided by the addition of δtj to the shift period of a stream when it passes the recycling circuit, is also equivalent. The rules for correction described above can thus be applied in exactly the same manner to a simulated mobile bed with a constant recycle flow rate as for the equivalent conventional simulated mobile bed, whether the feed is a supercritical liquid or gaseous. Example 3 illustrates this aspect of the invention.

A counter-current simulated mobile bed was operated as follows: sections of 1 m length and 1 cm diameter were packed with a Y zeolite equivalent to that of Example 1. Zone 1 comprised 7 sections, zone 5 contained 2 sections, zone 2 contained 6 sections, zone 3 contained 4 sections, and zone 4 contained 5 sections. During period 1 of the cycle, the eluent was injected into section 1, the extract was removed from the outlet to section 7, the internal reflux was injected to the inlet to section 10, the feed was injected into the inlet to section 16 and the raffinate was removed from the outlet to section 19. The eluent was substantially pure toluene at a flow rate of 7.5 cm³/min, the extract flow rate was 7.35 cm³/min. The internal reflux flow rate was 1.1 cm³/min and its composition was as follows: toluene 0.005%, ethylbenzene 0.035%, para-xylene 99.80%, meta-xylene 0.13%, orthoxylene 0.03%. The feed flow rate was 4.4 cm³/min and its composition was as follows: toluene 2.29%, ethylbenzene 10.11%, para-xylene 23.55%, meta-xylene 49.88%, orthoxylene 14.16%. Finally, the raffinate flow rate was 5.62 cm³/min (giving a loss of 0.22%). The constant flow rate applied to the recycling pump was 34 cm³/min and Table 3 shows the flow rates in the different zones as a function of time.

TABLE 3

| start | end | Zone 1 | Zone 5 | Zone 2 | Zone 3 | Zone 4 |
|---|---|---|---|---|---|---|
| 0 s | 404,6 s. | 41,5 cm³/min | 34,15 cm³/min | 35,25 cm³/min | 39,65 cm³/min | 34 cm³/min |
| 404,6 s | 777,95 s | 35,85 | 28,5 | 29,6 | 34 cm³/min | 28,35 |
| 777,9 s | 1271,75 s | 40,25 | 32,9 | 34 cm³/min | 38,4 | 32,75 |
| 1271,75 s | 1451,05 s | 41,35 | 34 cm³/min | 35,15 | 39,5 | 33,85 |
| 1451,05 s | 2177,30 s. | 34 cm³/min | 26,65 | 27,75 | 32,15 | 26,5 |

The recycling pump was solid with section 24: i.e., extractions from section 24 were made after this pump, just before injections into section 1. The dead volume of the recycling circuit was 17.25 cm³; there was a delay of 30.45 s in the normal sequencing of each circuits once a cycle. Thus the first shift of the eluent valve (injection section 1→ injection section 2) occurred after 109.85 s and not after 79.4 s, the sixth shift of the raffinate valve (removal section 23→extraction section 24) occurred after 529.4 s and not after 498.95 s, the tenth shift of the feed valve (injection section 1 → injection section 2) occurred after 891.1 s and not 860.65 s, the sixteenth shift of the internal reflux valve (injection section 1 → injection section 2) occurred after 1384.65 s and not 1354.2 s, and the eighteenth shift of the extract valve (removal section 23 → extraction section 24) occurred after 1580.75 s and not 1550.3 s. The compositions of the extract and raffinate were as follows:

Extract: toluene 71.06%, para-xylene 28.85%, metaxylene 0.09%;

Raffinate: toluene 42.02%, ethylbenzene 7.98%, paraxylene 0.14%, meta-xylene 38.78%, ortho-xylene 11.08%.

Table 4 below shows the sequencing of the valves.

TABLE 4

| | | Shift times | | |
|---|---|---|---|---|
| Outlet Zone 1 extract valve | Outlet Zone 5 int reflux valve | Outlet Zone 2 feed valve | Outlet Zone 3 raffinate valve | Outlet Zone 4 solvent valve |
| $t_1^7 = 81.35$ | $t_1^9 = 79.45$ | $t_1^{15} = 79.80$ | $t_1^{19} = 80.90$ | $t_1^{24} = 109.85$ |
| $t_2^8 = 162.65$ | $t_2^{10} = 158.90$ | $t_2^{16} = 159.55$ | $t_2^{20} = 161.85$ | $t_2^1 = 189.25$ |
| $t_3^9 = 244.00$ | $t_3^{11} = 238.35$ | $t_3^{17} = 239.35$ | $t_3^{21} = 242.75$ | $t_3^2 = 268.65$ |
| $t_4^{10} = 325.30$ | $t_4^{12} = 317.85$ | $t_4^{18} = 319.15$ | $t_4^{22} = 323.70$ | $t_4^3 = 348.05$ |
| $t_5^{11} = 406.95$ | $t_5^{13} = 397.30$ | $t_5^{19} = 398.95$ | $t_5^{23} = 404.60$ | $t_5^4 = 432.05$ |
| $t_6^{12} = 500.80$ | $t_6^{14} = 491.05$ | $t_6^{20} = 492.90$ | $t_6^{24} = 529.40$ | $t_6^5 = 527.30$ |
| $t_7^{13} = 594.70$ | $t_7^{15} = 586.25$ | $t_7^{21} = 587.90$ | $t_7^1 = 623.80$ | $t_7^6 = 622.55$ |
| $t_8^{14} = 688.60$ | $t_8^{16} = 681.50$ | $t_8^{22} = 682.95$ | $t_8^2 = 718.15$ | $t_8^7 = 717.75$ |
| $t_9^{15} = 782.90$ | $t_9^{17} = 776.70$ | $t_9^{23} = 777.95$ | $t_9^3 = 808.55$ | $t_9^8 = 808.30$ |
| $t_{10}^{16} = 866.75$ | $t_{10}^{18} = 859.35$ | $t_{10}^{24} = 891.10$ | $t_{10}^4 = 892.10$ | $t_{10}^9 = 890.75$ |
| $t_{11}^{17} = 950.60$ | $t_{11}^{19} = 941.80$ | $t_{11}^1 = 973.90$ | $t_{11}^5 = 975.65$ | $t_{11}^{10} = 973.20$ |
| $t_{12}^{18} = 1034.45$ | $t_{12}^{20} = 1024.30$ | $t_{12}^2 = 1056.7$ | $t_{12}^6 = 1059.20$ | $t_{12}^{11} = 1055.65$ |
| $t_{13}^{19} = 1118.30$ | $t_{13}^{21} = 1106.80$ | $t_{13}^3 = 1139.5$ | $t_{13}^7 = 1142.80$ | $t_{13}^{12} = 1138.05$ |
| $t_{14}^{20} = 1202.15$ | $t_{14}^{22} = 1189.25$ | $t_{14}^4 = 1222.25$ | $t_{14}^8 = 1226.35$ | $t_{14}^{13} = 1220.45$ |
| $t_{15}^{21} = 1286.00$ | $t_{15}^{23} = 1271.75$ | $t_{15}^5 = 1305.05$ | $t_{15}^9 = 1309.90$ | $t_{15}^{14} = 1302.90$ |
| $t_{16}^{22} = 1369.45$ | $t_{16}^{24} = 1384.65$ | $t_{16}^6 = 1383.90$ | $t_{16}^{10} = 1392.35$ | $t_{16}^{15} = 1384.80$ |
| $t_{17}^{23} = 1451.05$ | $t_{17}^1 = 1464.45$ | $t_{17}^7 = 1467.35$ | $t_{17}^{11} = 1478.75$ | $t_{17}^{16} = 1468.05$ |
| $t_{18}^{24} = 1580.75$ | $t_{18}^2 = 1566.25$ | $t_{18}^8 = 1568.75$ | $t_{18}^{12} = 1578.75$ | $t_{18}^{17} = 1566.0$ |
| $t_{19}^1 = 1680.20$ | $t_{19}^3 = 1668.15$ | $t_{19}^9 = 1670.15$ | $t_{19}^{13} = 1678.30$ | $t_{19}^{18} = 1667.80$ |
| $t_{20}^2 = 1779.60$ | $t_{20}^4 = 1769.95$ | $t_{20}^{10} = 1771.60$ | $t_{20}^{14} = 1778.10$ | $t_{20}^{19} = 1769.75$ |
| $t_{21}^3 = 1879.05$ | $t_{21}^5 = 1871.80$ | $t_{21}^{11} = 1873.00$ | $t_{21}^{15} = 1877.9$ | $t_{21}^{20} = 1871.65$ |
| $t_{22}^4 = 1978.50$ | $t_{22}^6 = 1973.60$ | $t_{22}^{12} = 1974.40$ | $t_{22}^{16} = 1977.7$ | $t_{22}^{21} = 1973.55$ |
| $t_{23}^5 = 2077.90$ | $t_{23}^7 = 2075.45$ | $t_{23}^{13} = 2075.85$ | $t_{23}^{17} = 2077.50$ | $t_{23}^{22} = 2075.40$ |
| $t_{24}^6 = 2177.30$ | $t_{24}^8 = 2177.30$ | $t_{24}^{14} = 2177.30$ | $t_{24}^{18} = 2177.30$ | $t_{24}^{23} = 2177.30$ |

We claim:

1. A process for the simulated mobile bed separation of a feed (A+B) containing at least two constituents in the presence of at least one eluent (S) into at least two fractions, comprising n, advantageously 4 to 24, chromatographic columns or column sections mounted in series and in a closed circuit, in which a liquid, supercritical or gaseous mixture circulates under pressure, the circuit having at least one feed injection stream, at least one eluent injection stream, at least one extract extraction stream (EA) and at least one raffinate extraction stream (RB), at least four zones each comprising at least two sections being determined in said columns, each zone being separated from the following zone by an injection or extraction stream, the injection and extraction streams being independently shifted at programmed time intervals such that after n shifts, each stream has traversed the whole circuit, the closed circuit comprising a recycling pump for said mixture, which is flow rate regulated and located between two successive columns or column sections, optionally at least one measuring or sampling means and optionally at least one recycling pump which is pressure regulated, said measuring or sampling means and/or the pressure regulated recycling pump each being located between two consecutive columns or column sections, said pumps and/or measuring or sampling means each having a dead volume in the recycling circuit which causes perturbations in the extract and in the raffinate composition, the circuit optionally containing one or more sections whose separation properties are degraded compared with those of other sections, thus causing perturbations in the composition of the extract and of the raffinate, the process comprising, each time that an injection or extraction stream passes from an immediately anterior position to an immediately posterior position to each of the dead volumes in the circuit or each of the sections with degraded separation properties, the connection period for said stream to the circuit is first increased by an appropriate value, and then when the stream passes from the immediately posterior position to the dead volume or degraded section to the following position, said connection period is reduced so that said period regains the value which would have been applied if the dead volume had not occurred or the degradation in the separation properties had not occurred.

2. A process according to claim 1, in which the simulated mobile bed is operated with a constant recycle flow rate.

3. A process according to claim 1, in which the mixture is liquid or supercritical and in which the connection period for said stream to the circuit is increased in accordance with the relationships:

$$T'=T+\delta tj \text{ and } vj/max(D_i)<\delta tj<vj/min(D_i),$$

where T and T' respectively represent the connection period for an injection or extraction stream to a position in the circuit which is not immediately downstream of a dead volume and the connection period for an injection or extraction stream at a position immediately downstream of a dead volume, $\delta tj$ represents the incremental period added to T to correct the perturbations in the composition of the extract and raffinate resulting from said dead volume, vj represents the dead volume, $max(D_i)$ and $min(D_i)$ respectively represent the highest and the lowest recycle flow rates for the conventional simulated mobile bed and which would have been these values for a simulated mobile bed with a constant recycle flow rate.

4. A process according to claim 3, in which the connection period to the circuit is changed according to the relationship:

$$f.T+f'.V/max(D_i)<T'<f.T+f'.V/min(D_i)$$

and preferably in accordance with the relationship:

$$T'=f.T+f'.V/DM$$

or in accordance with the relationship:

$$T'=f.T+f'.V/Drcy,$$

where T', T, $max(D_i)$, $min(D_i)$, DM and Drcy have the same meanings as those given in claim 3, and where f represents the ratio of the length of one section with isotropic properties to the other sections, to a normal section length, where V represents the voice volume of section and where f' represents the ratio of the length of void section which must be associated with the shortened section with isotropic properties to obtain the equivalent separation properties to a section whose properties are degraded, to a normal section length.

5. A process according to claim 3, in which said mixture is a pressurized gas or a less dense supercritical fluid, and one or more recycling compressor(s) is/are used in place of the recycling pump(s), and the connection period for the streams to the section is increased by a value of $\delta tj.df/da$, where ta is the parameter in claim 3 and df is the density of the fluid phase, da being the density of the adsorbed phase.

6. A process according to claim 3, in which the circuit comprises at least two distinct dead volumes between two successive sections, the extraction and injection streams being between the distinct dead volumes, and in which the connection period for each stream is increased at each section in accordance with the relationships in claim 3.

7. A process according to claim 1, in which the incremental period is defined by the relationships:

$$\delta tj=vj/DM$$

and $$\delta tj=vj/Drcy,$$

where DM is the average weighted recycle flow rate in the case of conventional simulated mobile bed, and Drcy is the constant recycle flow rate in the case of a simulated mobile bed with a constant recycle flow rate.

8. A process according to claim 1, in which the recycling pump(s) or compressor(s) and/or the measuring means are located immediately downstream of the column preceding them and immediately upstream of the extract or raffinate extraction stream upstream of the column following them.

9. A process according to claim 1, in which the pump(s) or compressor(s) and/or the measuring means are located immediately downstream of extract or raffinate extraction stream and immediately upstream of the column following them.

10. A process according to claim 1, in which the pump(s) or compressor(s) and/or the measuring means are located immediately downstream of the extract or raffinate extraction stream and immediately upstream of the feed or eluent injection stream.

11. A process according to claim 1, in which the simulated mobile bed is in counter-current mode.

12. A process according to claim 1, in which the simulated mobile bed is in co-current mode.

13. A process according to claim 1, in which the feed comprises a mixture of aromatic hydrocarbons containing 8 carbon atoms.

* * * * *